Nov. 11, 1969   KENSEI SUZUKI ETAL   3,477,550
HYDRAULIC LOCK DEVICE
Filed May 3, 1968   2 Sheets-Sheet 1
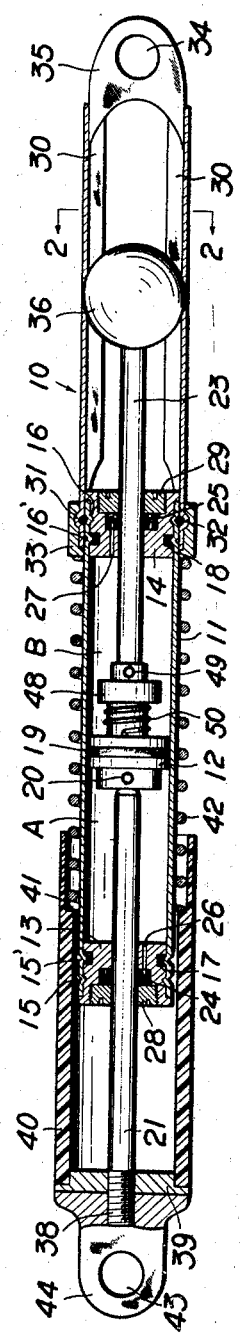
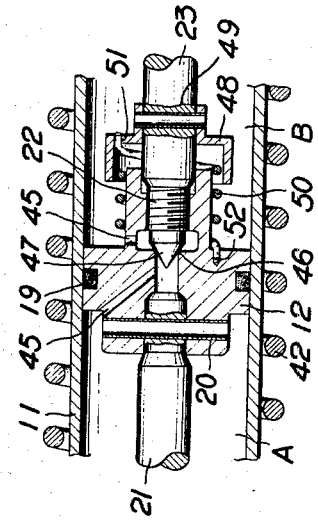
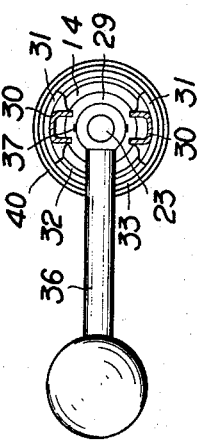
INVENTORS
Kensei Suzuki. Shigeo Tamura
Yoshinori Kawachi. Naohiro
BY                          Nagafuji
Their Attorney

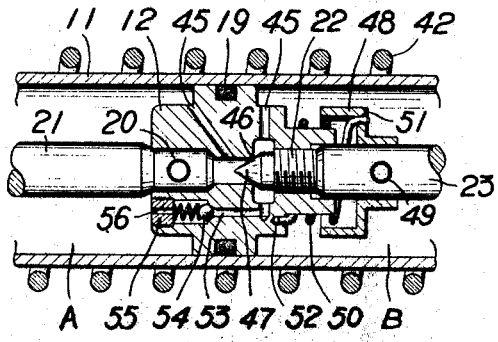

United States Patent Office 3,477,550
Patented Nov. 11, 1969

3,477,550
HYDRAULIC LOCK DEVICE
Kensei Suzuki, 4316 Dota, Kani-machi, Kani-gun, Gifu-ken; Shigeo Tamura, 32 Kamono, Kamono-cho, Minokamo-shi, Gifu-ken; Yoshinori Kawachi, 2595 Sakurai, Dota, Kani-machi, Kani-gun, Gifu-ken; and Naohiro Nagafuji, 3041–2 Wakamiya, Ota-cho, Minokamo-shi, Gifu-ken, all of Japan
Filed May 3, 1968, Ser. No. 726,500
Claims priority, application Japan, Oct. 5, 1967 (utility model), 42/84,496; Feb. 27, 1968 (utility model), 43/14,158
Int. Cl. F16d 57/06
U.S. Cl. 188—96
9 Claims

ABSTRACT OF THE DISCLOSURE

A hydraulic lock device, in which in order to hydraulically lock a piston fitted into a sealed cylinder at a desired position within the cylinder, one end of a connecting rod is securely fixed to one side of the piston while the other end of the connecting rod extends beyond one end of the cylinder and has a fixture member so as to prevent the rotation of the piston; one end of an extended bracket is securely fixed to the other end of the cylinder while the other end of the extended bracket has another fixture member; the piston has a communication bore bored therethrough for communication between chambers on both sides of the piston, said bore having therein a valve seat; a piston rod is threaded to the piston so as to oppose to the valve seat; the threaded end of the piston rod is formed into a valve which moves to and away from the valve seat when the piston rod is rotated from the outside of the hydraulic lock device.

Background of the invention

The present invention relates to a hydraulic lock device for use with a reclining chair in an airplane, a rolling stock, an automobile and the like for adjusting the angle of inclination; with an awning window used as a rear window in an automobile, a window for a building for adjusting the angle of opening of the window, and the like.

Various mechanisms and constructions of the hydraulic lock device have been proposed, for example, for adjusting the angle of inclination of the reclining chair. In the prior art hydraulic lock devices, a working liquid is filled into a sealingly closed cylinder into which is slidably fitted a piston. The interior of the cylinder is divided into two chambers. The piston is provided with a passage for communication of the two chambers and a valve assembly such as a spherical valve is disposed in the passage. The piston rod extending from the cylinder is hollow so as to fit an operating rod which is pushed from the outside directly or through a screw so as to move relative to the piston rod in the longitudinal direction thereof, thereby opening or closing the valve assembly. Therefore, when the valve is opened, the relative movement between the sealingly closed cylinder and the piston is permitted while when the valve is closed, the relative motion is not permitted so that the hydraulic lock is effected at this position. Even though the prior art hydraulic lock devices can hydraulically lock the relative movement of the piston and the sealed cylinder at a desired position, the constructions are much complicated and costs are high because, as described above, a valve assembly such as a spherical valve must be incorporated in the piston and the rod must be made hollow so as to fit the operating rod therein for operating the valve assembly.

Brief summary of the invention

In view of the above, the present invention has for its object to improve a hydraulic lock device of the type described and to provide an improved hydraulic lock device simple in construction and low in production cost for ensuring the positive hydraulic lock of the relative movement between a piston and a cylinder at a desired position as in the case of the conventional device.

The features which are believed to be characteristic to the present invention are that an extended bracket is securely fixed to one end of a sealed cylinder and has at the free end thereof a fixture member; one end of a connecting rod is securely fixed to a piston while the other end of the connecting rods extends beyond the other end of the cylinder and has a fixture member so as to prevent the rotation of the piston; a valve seat is directly formed in a communication hole bored through the piston for communication between two liquid chambers in the cylinder on both side of the piston; a piston rod is threaded to the piston and the threaded end of the piston rod is directly formed into a valve which is adapted to move toward and away from the valve seat when the piston rod is rotated from the outside of the hydraulic device; as needs demand, a relief valve may be provided in the piston so as to prevent the breakdown of the device caused by the impact force exerting to the device from the outside; and a free bearing biased by means of a spring is fitted into the sealingly closed cylinder so as to compensate the volumetric variation of the working liquid within the cylinder due to the environmental temperature variation.

The above and other objects, features and effects of the present invention will be best understood from the description with reference to the accompanying drawing.

Brief description of the view of the drawings

FIG. 1 is a longitudinal sectional view of one embodiment of a hydraulic lock device according to the present invention;

FIG. 2 is a sectional view taken along the line 2–2 of FIG. 1;

FIG. 3 is an enlarged, sectional view of a valve mechanism portion;

FIG. 4 is a front sectional view thereof when a piston is provided with a relief valve;

FIG. 5 is a longitudinal sectional view showing a free bearing disposed in a closed cylinder; and FIG. 6 is an explanatory view of a hydraulic lock device of the present invention equipped to a reclining chair in order to adjust the angle of inclination thereof.

Detailed description of a preferred embodiment

In FIG. 1, a hydraulic lock device according to the present invention generally designated by 10 is shown as being held at an intermediate position in the whole stroke thereof. The hydraulic lock device 10 is comprising a closed cylinder 11 and a piston 12 which is fitted into the cylinder 11 for slidable movement therein. The cylinder 11 has at both ends thereof bearings 13 and 14, which are fitted into the cylinder 11 from the outside. These bearings 13 and 14 are securely held in position relative to the cylinder 11 by means of roll-caulked portions 15 and 15' and 16 and 16' respectively. Between the rolled caulking portions 15' and 16' and the cylinder 11 are interposed seals 17 and 18 so that the joints between the cylinder 11 and the bearings 13 and 14 are completely sealed. The piston 12 slidably fitted in the cylinder 11 has a seal 19 disposed around the outer periphery of the piston 12 and adapted to make a slidable contact with the inner wall surface of the cylinder 11. Furthermore, this seal 19 divides the cylinder 11 into two liquid chambers A and B. The piston 12 has a connecting rod 21 which is coupled to one end of the piston 12 by means of a spring pin 20, and further a piston rod 23 which is screwed to the other end of the piston 12 by means of the screw threads 22. The piston rod 23 has a diameter equal to that of the connecting rod 21. The connecting rod 21 is extending through the liquid chamber A and the bearing 13 to the outside while the piston rod 23 is extending through the liquid chamber B and the bearing 14 to the outside. The connecting rod 21 and the piston rod 23 are sealed by packings 24 and 25 respectively which are fixed to the bearings 13 and 14 respectively and are in sealing contact with the sliding surfaces of the connecting rod 21 and the piston rod 22. Therefore, the liquid chambers A and B are maintained liquid-tight.

The bearings 13 and 14 have axial bores 26 and 27 respectively for introducing a working liquid into the cylinder 11. That is, after the piston 12 having the connecting rod 21 and the piston rod 23 is fitted into the cylinder 11, the bearings 13 and 14 are fitted to the ends of the cylinder 11 and securely held in position by means of roll-caulked portions 15 and 15' and 16 and 16'. Thereafter, the air within the cylinder 11 is exhausted from one of the bores 26 and 27 while the working liquid is forced into the cylinder 11 through the other of the bores 26 and 27 until the cylinder 11 is entirely filled with the working liquid. In this case, a valve at the extreme end of the piston rod 23 which will be described in detail hereinafter is kept opened so as to communicate the liquid chamber A with the liquid chamber B. Thereafter, the bores 26 and 27 are covered with the packings 24 and 25 respectively which are secured to the bearings 13 and 14 respectively. Next these packings are pressed by means of plugs 28 and 29 threaded to the bearings 13 and 14 respectively so that the clearances between the sliding surfaces of the connecting rod 21 and the piston rod 22 and the bearings 13 and 14 are sealed respectively by the packings 24 and 25. The above described method of filling into the cylinder the working liquid and sealing the bores 26 and 27 used as inlet and outlet ports is one of the remarkable advantages of the present invention because the filling and sealing operation can be effected in a simple manner.

In the embodiment, shown in FIG. 1 each of the bearings 13 and 14 has one bore 26 or 27 respectively, but one of the bearings 13 and 14 may have two bores as inlet and outlet ports respectively. The base portion of an extended bracket 30 is fitted over one end portion of the cylinder through which extends outwardly the piston rod 23. The extended bracket 30 is provided with a groove 31 at the base portion thereof into which is fitted a snap ring 32 which in turn is fitted over the roll-caulked portion 16 of the cylinder 11. Over the base portion of the extended bracket 30 is fitted a spring bearing 33 so that the extended bracket 30 is securely fixed to the cylinder 11. At the free end of the extended bracket 30 is securely fixed by welding or the like a fixture member 35 having a fixture hole 34. At the free end of the piston rod 23 is securely fixed a handle 36 by means of a knock pin 37 as best seen from FIG. 2.

The free end of the connecting rod 21 which extends outwardly from the other end of the cylinder 11, that is on the side of the bearing 13 is threaded as shown by 38. A nut 39 is threadably engaged with this threaded screws 38 and is fitted into a cover 40 which extends toward the cylinder 11. The cover 40 has a stepped portion 41 which is adapted to receive a spring. A return spring 33 is loaded between this stepped portion 41 and the spring bearing 33 fitted over the cylinder 11. The biasing force of this spring 42 is imparted to the cylinder 11 through the spring bearing 33 so that the piston 12 is normally biased toward the bearing 13 of the cylinder 11.

A fixture member 44 having a fixture hole 43 is threadably engaged with the screw threads 38 at the free end of the connecting rod 21 after the nut 39 has been threaded. This fixture member 44 is disposed in opposite to the fixture member 35 securely fixed to the free end of the extended bracket 30 which is extending from the cylinder 11. The hydraulic lock device 10 is installed by means of these fixture members 35 and 34. In the installed state of the hydraulic lock device 10, the cylinder 11 which is connected through the extended bracket 30 to the fixture member 35 makes a sliding movement relative to the piston 12 which is connected through the connecting rod 21 to the fixture member 44, without causing a relative rotation between the cylinder 11 and the piston 12. Thus, the mechanism for preventing the rotation can be obtained. Now referring to FIG. 3, the construction of the piston 12 fitted into the cylinder 11 will be described in detail hereinafter. As shown in FIG. 3, the piston 12 has a through bore 45 which communicates the liquid chamber A with the liquid chamber B, said two chambers being disposed on both sides of the piston 12. A valve seat 46 is formed in the through bore 45. This valve seat 46 is opposed to the end of the piston rod 23 threaded to the piston 12 by means of the threaded screws 22. The end of the piston rod 23 is used as a valve 47 adopted to seat on the valve seat 46 and move away therefrom. A cap body 48 is fitted over the piston rod 24 by means of a spring 49 in the liquid chamber B. A spring 50 is loaded between the cap body 48 and the piston 12. One end of the spring 50 is engaged in an engaging hole 51 provided at the cap body 48 while the other end of the spring 50 is engaged in an engaging hole 52 provided in the piston 12. Therefore, the piston rod 23 is normally imparted with the rotational force in the clockwise direction from the spring 50.

Therefore, when the piston rod 23 is normally rotated and advanced toward the piston 12 under the action of the spring 50, the valve 47 at the end of the piston rod 23 is pressed against the valve seat 46, thereby closing the communication hole 45, whereby the communication between the liquid chamber A and B is interrupted. However, when the handle 36 is operated from the outside so as to impart to the piston rod 23 the rotational movement in the counterclockwise direction, the piston rod is rotated and retracted like a screw from the piston 12 so that the valve 47 at the end of the piston rod 23 is moved away from the valve seat 46, whereby the liquid chambers A and B are communicated with each other through the communication hole 45. Thus, interposing the spring 50 between the piston 12 and the piston rod 23 in the liquid chamber B serves to prevent creak or squeak caused by rotation of the piston rod 23 from being transmitted to outside and to facilitate the rotation of the piston rod 23. As is clear from the above description, when the handle 36 is operated from the outside against the spring 50 so as to rotate the piston rod 23 in the counterclockwise direction, thereby moving away the valve 47 at the end of the piston rod 23 away from the valve seat 46, the piston 12 moves to the left in FIG. 1 under the action of the return spring 42, and forces the working liquid in the liquid chamber A into the liquid chamber B through the communication hole 45. In this case, when the fixture members 35 and 44 are forced to move toward each other by the force stronger than the force of the return spring 42, the piston 12 is caused to move toward the right in FIG. 1 and forces the working liquid in the liquid chamber B into the liquid chamber A through the communication hole 45, thereby permitting to adjust the distance between the fixture members 35 and 44 suitably.

When the force exerting on the handle 36 is relieved when the distance between the fixture members 35 and 44 becomes a desired distance, the piston rod 23 is caused to rotate and advance toward the right under the action of the spring 50 so that the valve 47 at the end of the piston rod 23 is pressed against the valve seat 46, thereby closing the communication hole 45. Thus, the piston 12 is hydraulically locked in this position.

When the impact force is exerted upon the fixture members 35 and 44 in the hydraulically locked position, the cylinder 11 will be susceptible to breakdown. In order to prevent such accident, a by-pass 53 is provided in the communication hole 45 of the piston 12 as best shown in FIG. 4. A relief valve 54 is interposed in the by-pass 53. Therefore, when the impact force is exerted on the fixture members 35 and 44 so as to reduce the distance therebetween so that the pressure of the liquid in the liquid chamber B rises above a predetermined level, the relief valve 54 is opened so that the working liquid in the liquid chamber B is forced into the liquid chamber A through the by-pass 53 and the relief valve 54, thereby forcing the piston 12 toward the right. Thus, the breakdown of the cylinder 11 can be prevented. In this case, when it is desired to limit the moving speed of the piston 12 so as to gradually damp the impact exerting upon the fixture members 35 and 44, a through bore 56 provided in a spring bearing 55 of the relief valve 54 may be formed into the shape of an orifice so that the impact force can be damped gradually by the flow resistance through this orifice.

In FIG. 4, the relief valve 54 is shown as being opened from the liquid chamber B to the liquid chamber A. But a relief valve which opens from the liquid chamber A to the liquid chamber B may be provided when there is a fear that the impact force is exerted on the fixture members in the direction in which the fixture members are moved away from each other. When the impact forces exerts on the fixture members from both directions, moving the fixture members toward and away from each other, two relief valves each of which opens in the opposite direction relative to the other should be fitted in the piston 12 in order to prevent the breakdown of the hydraulic lock device.

FIG. 5 illustrates a hydraulic lock device of the present invention incorporating a temperature compensation mechanism.

When the working liquid within the liquid chamber A and B expands or contracts according to the environmental temperature variation, the working liquid will leak to the outside from the liquid chamber or vacuum will be produced in the liquid chambers so that the positive hydraulic locking cannot be ensured.

In order to prevent the leakage or to prevent the vacuum from being produced in the liquid chambers, a free bearing 57 is slidably disposed in the liquid chamber A of the cylinder 11. A seal 58 is fitted over the free bearing 57 for sliding contact with the inner wall of the cylinder 11 and a packing 59 is fitted into the free bearing 57 for a sliding contact with the connecting rod 21 so as to sealingly close the liquid chamber A. A bearing 61 is fitted into the cylinder 11 and is securely held in position by a roll-caulked portion 60. Between this bearing 61 and the free bearing 57 is loaded a spring 62 so that the working liquid in the liquid chamber A is imparted with the pressure through the free bearing 57 from the spring 62, whereby the volumetric change of the working liquid within the cylinder 11 can be compensated. As shown in FIG. 5, it is not necessary to provide a seal or packing for the bearing 61 closing one end of the cylinder 11 or to provide a drain hole in the bearing 61. But a drain hole 64 must be bored through the free bearing 57, and the drain 64 is closed by the packing 59 and a plug 63 pressing the packing 59.

In order that the hydraulic lock device 10 according to the present invention may be understood more clearly, the description will be directed hereinafter to a reclining chair incorporating a hydraulic lock device of the invention in order to adjust the backrest angle of the chair shown in FIG. 6.

As shown in FIG. 6, the fixture member 44 of the hydraulic lock device 10 is connected to the bracket 66 extending from the lower side of a chair 65 while the fixture member 35 is connected to a supporting rod 68 extending from the backrest 67. When no force is exerted upon the handle 36, the piston rod 23 is rotated and advanced toward the piston 12 through the threaded screws 22 under the action or force of the spring 50 so that the valve 47 at the end of the piston rod 23 is pressed against the valve seat 46 on the side of the piston 12, whereby the communication between the liquid chamber A and B through the communication hole 45 is interrupted. Therefore, the relative motion between the cylinder 11 and the piston 12 is not permitted so that the relative position of the fixture member 35 connected to the cylinder 11 through the extended bracket 30 relative to the fixture member 44 connected to the piston 12 through the connecting rod 21 remains unchanged. Therefore, even if the force is exerted to the backrest 67 in both directions, the backrest is not permitted to move, the angle of inclination remaining unchanged. Now when the force is applied to the backrest 67 in the direction to incline the backrest backwardly and the handle 36 is turned to the left so that the piston rod 23 is rotated in the counterclockwise direction against the spring 50, the piston rod 23 is rotated and retracted from the piston 12 through the threaded screws 22 because the piston 12 is coupled to the bracket 66 on the side of the chair 65 through the connecting rod 21 so that the piston 12 cannot rotate. Therefore, the valve at the end of the piston rod 23 is moved away from the valve seat 46 on the side of the piston 12 so that the communication hole 45 is opened, thereby communicating the liquid chamber A to the liquid chamber B. Then, the backrest 67 and a supporting rod 68 supporting the backrest 67 are exerted with the force directed backwardly and rotated about an axle 80 of the supporting rod 68. This force is transmitted from the lower end of the supporting rod 68 to the fixture member 35 of the hydraulic lock device 10 so that the cylinder 11 is forced to the left against the return spring 42 through the extended bracket 30. Thus, the cylinder 11 moves toward the left and forces the working liquid in the liquid chamber B into the liquid chamber A through the communication hole 45 bored through the piston 12 so that the backrest 67 is inclined backwardly to a desired angle of inclination. When the backrest 67 is inclined to a desired angle, the handle 36 is relieved. Then, the handle 36 is rotated in the clockwise direction together with the piston rod 23 under the action of the return spring 50. The piston rod 23 is rotated and advanced through the threaded screws 22 toward the piston 12 so that the valve 47 at the end of the piston rod 23 is pressed against the valve seat 46 of the piston 12, thereby closing the communication port 45, whereby the communication between the liquid chambers A and B are interrupted. Thus, the cylinder 11 is hydraulically locked in this position so that the backrest 67 is securely held in position at the desired angle of inclination.

On the other hand, when no force is exerted to the backrest 67 while the handle 36 is turned to the left, the piston rod 23 is rotated in the counterclockwise direction against the spring 50, so that the valve 47 at the end of the piston rod 23 is moved away from the valve seat 46 on the side of the piston 12. Then, the cylinder 11 moves toward the right and forces the working liquid in the liquid chamber A into the liquid chamber B through the communication hole 45 bored through the piston 12. Therefore, the backrest 67 is caused to rise forwardly through the extended bracket 30 and the supporting rod 68. When the handle is relieved at a desired angle of inclination of the backrest 67, the piston rod 23 is caused to rotate in the clockwise direction under the force of the spring 50 so that the valve 47 at the end of the piston rod 23 is pressed against the valve seat 46 on the side of the piston 12, thereby closing the communication hole 45. Therefore, the cylinder 11 is hydraulically locked and the backrest 67 is securely held in position at the desired angle of inclination.

Preferred embodiment of the present invention has been described hereinbefore, and there will be immediately obvious to those who are skilled in the art that various variations, alternations and/or modifications may be resorted to without departing from the spirit and scope of the present invention. It is therefore desired that all such modifications, alternations and/or variations which could achieve the same effect of the present invention through the use of substantially same or equivalent device are understood to fall in the scope of the present invention.

What is claimed is:

1. A locking device comprising
   a cylinder member;
   a substantially non-compressible liquid filling said cylinder member;
   a piston device operating within said cylinder and dividing the same in two chambers;
   a passageway in said piston device adapted for providing communication between said chambers;
   a valve provided in said passageway for alternately closing and opening said passageway;
   a piston rod adapted for longitudinal and turning movement within said cylinder member; having one end located within said cylinder member and another end outside thereof.
   connecting means between said piston rod and one side of said piston device adapted to secure joint longitudinal movement of said piston rod and said piston device but allowing a predetermined axial turning movement of said piston rod relative to said piston device; and
   a valve closure member on said one end to close said valve of the piston rod; means rotatably biasing said piston rod to a valve closing position;
   turning movement of said piston rod moving said valve closure member to open said valve against its bias and to allow passage of fluid from one of said chambers into the other of said chambers.

2. A locking device comprising
   a cylinder member;
   a substantially non-compressible liquid filling said cylinder member;
   a piston device operating within said cylinder and dividing the same in two chambers;
   a passageway in said piston device adapted for providing communication between said chambers;
   a valve provided in said passageway for alternately closing and opening said passageway;
   a piston rod adapted for longitudinal and turning movement within said cylinder member; having one end located within said cylinder member and another end outside thereof; adapted to secure joint longitudinal movement of said piston rod and said piston device but allowing a predetermined axial turning movement of said piston rod relative to said piston device and biasing said piston rod into one axial direction;
   a valve closure member on said one end of said piston rod;
   a torsion spring having one end thereof secured to said piston device and the other end thereof secured to said piston rod; and
   turning movement of said piston rod moving said valve closure member to open said valve against the bias of said torsion spring and to allow passage of fluid from one of said chambers into the other of said chambers.

3. A locking device comprising
   a cylinder member;
   a substantially non-compressible liquid filling said cylinder member;
   a piston device operating within said cylinder and dividing the same in two chambers;
   a passageway in said piston device adapted for providing communication between said chambers;
   a valve provided in said passageway for alternately closing and opening said passageway;
   a piston rod adapted for longitudinal and turning movement within said cylinder member; having one end located within said cylinder member and another end outside thereof;
   connecting means between said piston rod and one side of said piston device adapted to secure joint longitudinal movement of said piston rod and said piston device but allowing a predetermined axial turning movement of said piston rod relative to said piston device; and
   a valve closure member carried by said piston rod to close said valve; means rotatably biasing said piston rod to a valve closing position;
   turning movement of said piston rod moving said valve closure member to open said valve against its bias and to allow passage of fluid from one of said chambers into the other of said chambers.

4. A locking device according to claim 3 comprising a connecting rod means secured to the other side of said piston device and having an outer end located outside the cylinder member, said connecting rod means adapted for longitudinal movement jointly with said piston device.

5. A locking device according to claim 4 wherein the outside diameter of said piston rod is equal to the outside diameter of said connecting rod means.

6. A locking device according to claim 4 which comprises additionally a temperature compensating valve means.

7. A locking device according to claim 4 which includes a temperature compensating valve means.

8. A locking device according to claim 4 wherein said connecting rod means is provided with attachment means and biasing means interposed between the cylinder member and said attachment means.

9. A locking device according to claim 8 wherein said biasing means is adopted for urging said attachment means away from said cylinder member.

References Cited

UNITED STATES PATENTS

| 2,559,047 | 7/1951 | Porter et al. |
| 2,643,112 | 6/1953 | Smith. |
| 2,657,595 | 11/1953 | Shaff. |
| 3,223,206 | 12/1965 | Bainbridge et al. |

FOREIGN PATENTS

| 726,361 | 3/1955 | Great Britain. |

GEORGE E. A. HALVOSA, Primary Examiner

U.S. Cl. X.R.

248—354; 297—355